Oct. 21, 1947.  F. A. MILLER  2,429,561
PRECISION COUPLING
Filed Nov. 19, 1943
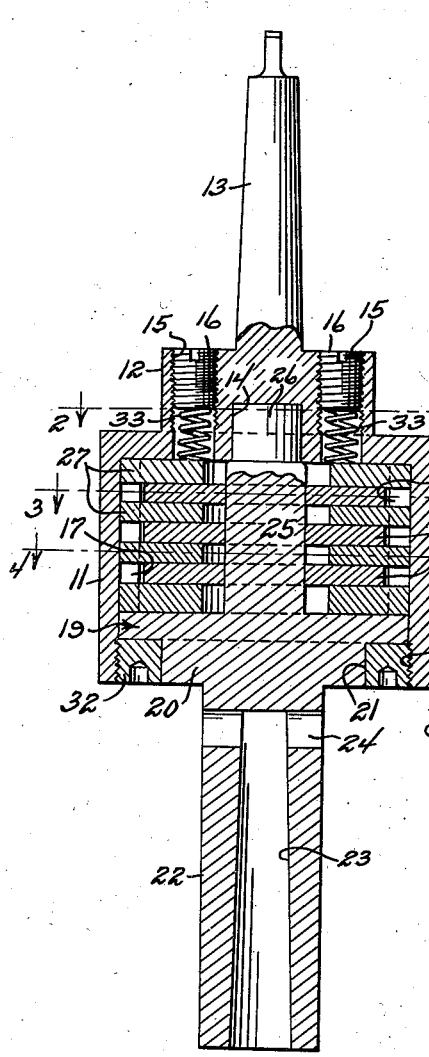
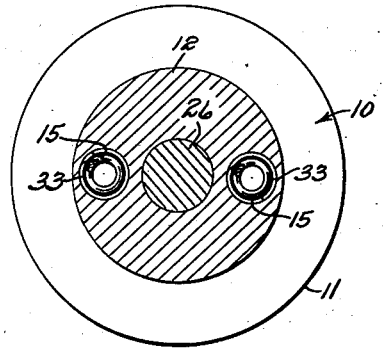
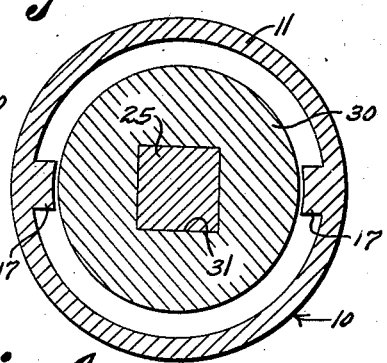
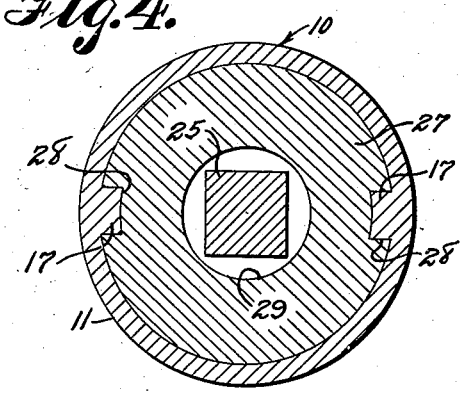
Frank Alden Miller INVENTOR.
BY
Victor J. Evans & Co.
ATTORNEYS Patented Oct. 21, 1947

2,429,561

UNITED STATES PATENT OFFICE 2,429,561

PRECISION COUPLING

Frank Alden Miller, Buffalo, N. Y., assignor to Buffalo Machinery Company, Inc., Buffalo, N. Y., a corporation of New York Application November 19, 1943, Serial No. 510,973

7 Claims. (Cl. 64—30)

The present invention relates to the art of overload releasing couplings and has for a primary object the provision of such a coupling which functions with improved precision.

Another object of the invention is to provide a precision coupling constructed so that wear is reduced to a minimum.

A further object of the invention is the provision of a coupling of the aforesaid character which embodies improved lubrication characteristics.

Still another object of the invention is to provide a coupling of the above character which is highly reliable for automatic operation within exceptionally close limits.

A still further object of the invention is the provision of a coupling device of the aforesaid nature which is relatively simple and compact in construction and which is applicable to various forms of mechanism in which release of overloads or excessive torsional strain on machine parts is desired.

Figure 1 is a longitudinal sectional view through the assembled coupling.

Figure 2 is a transverse section taken on line 2—2 of Figure 1,

Figure 3 is a transverse section taken on line 3—3 of Figure 1, and

Figure 4 is a transverse sectional view taken on line 4—4 of Figure 1.

Referring to the drawing which illustrates a preferred example of the invention and wherein like reference characters denote corresponding parts throughout, 10 generally designates the female section of the coupling embodying a cylindrical body 11 open at one end and formed with a diametrically reduced shoulder portion 12 exteriorly of the closed end. Projecting axially outward of the shoulder 12 for connection with a rotary mechanism is a tapered shank 13 integral with the shoulder. At its inner side the shoulder 12 is formed with a socket 14 opening inward of the body and disposed centrally thereof. At diametrically opposed sides the shoulder 12 is also formed with axially extending through bores 15 interiorly threaded from their outer ends to a point short of the inner end. Each of these bores normally carries a screw element 16 threaded into its outer portion. Interiorly of the circumferential wall of the body 11 are formed a pair of axially extending diametrically opposed ribs 17 of rectangular cross section advantageously elongated circumferentially of the wall with their inner concave edges concentric with body axis. These ribs extend from the end closing wall of the body 10 to a point short of the opposite open end for a purpose which will be hereinafter described. The body is interiorly screw threaded at its open end as indicated at 18.

A male section generally denoted at 19 is designed for complementary assembly with the female section 10 and constitutes a disk shaped head 20 of a size suitable for slidable fitting within the open end of the section 10. This head is also provided with an annular rabbeted groove 21 in its outer peripheral portion. Extending axially outward of the head 20 and formed integral therewith is a hollow connecting shank 22 provided with a tapered axial bore 23 and a transverse bore 24 intersecting the axial bore at its inner end. Projecting axially inward of the head 20 is a stud 25 having the major length from the head to a point short of its outer end of non-circular advantageously square cross section and having a round end extension 26.

Within the cylindrical body 11 is removably fitted a set of, in the present instance four, friction members 27 in the present example in the form of flat circular plates or disks provided, at diametrically opposed points, with indentations or notches 28 opening at the periphery and designed to slidably engage the ribs 17. As shown to advantage at Figures 1 and 4, the friction disks 27 have an exterior diameter affording a sliding fit within the socket 11 and are provided with circular center openings 29 having a diameter greater than the largest transverse dimension of the stud 25.

On the stud 25 are fitted a set of co-acting friction members or disks 30, in the present example three, each of which has an external diameter slightly less than the diametrical dimension between the inner edges of the ribs 17 and a central square opening 31 of a size affording a sliding fit over the stud.

The coupling parts are assembled by disposing the disks 27 and 30 in alternate arrangement within the socket body with the stud extended therethrough and having its end extension 26 rotatably fitted in the socket 14. Such assembly brings the outer face of the head 20 approximately flush with the open edge of the body 11 and the inner face of the head in abutment with or in close proximity to the outer ends of the ribs 17. An exteriorly threaded locking ring 32 is threaded within the outer threaded portion 18 of the body and assumes a seated position slidably fitted within the rabbeted groove 21 of the head to removably hold the sections in operative assembly. A coiled compression spring 33 is fitted within each of the bores 15 and compressed between the screw 16 therein and the innermost friction disk 27.

During operation, one of the co-axial shanks is connected with a driving member and the other connects with a driven member while the springs 33 exert predetermined pressure against the friction members to cause the coupling sections to rotate in unison under predetermined operating conditions. Should the driven member be subjected to torsional strain exceeding a selected limit slippage between the sets of disks having non-rotary connection with the respective coupling sections will result so that the driving section will overrun the driven section to effect release of the latter. The thrust or continual axial pressure exerted by the compression springs 33 can be pre-set at the factory although limited regulation could be made by adjustment of the screws 16 and further varied by the use of springs of varying compression.

As can be observed from Figure 1, the friction disks connected for rotation with the respective male and female sections of the coupling are disposed to afford a substantial overlapping relation to present frictional contacting surfaces of relatively large area. While the disks of one set, as for example the disks 30, may be constructed of ferrous material such as cold rolled steel, those of the complementary set 27 are constructed to provide highly efficient lubrication at the contacting surfaces coupled with suitably effective friction characteristics. This is accomplished by forming one set of the disks of a composition including bronze admixed with graphite. Such disk construction provides desirable qualities of lubrication while affording sufficient friction between the contiguous faces to enable release within one half to one per cent of torque increase on the driven section. Thus, conditions interfering with release, such as lubricant adhesion, are completely eliminated and reliable overload release is effected under all conditions including a wide range of temperature variation and long periods of non-use and within exceptionally close limits of torsional variance. The coupling has been found highly efficient for the application of a nosepiece to a shell, where great accuracy is essential and is advantageously useful for various other applications such as drill-press lathe and tapping machine work where prevention of tool breakage is highly desirable.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a coupling device having a drive member and a driven member a cylindrical body on said drive member a shoulder portion on said body, vertical threaded bores in said shoulder portion, compression springs in said bores, means for compressing said springs in said bores, a disk shaped head on said driven member adapted to be assembled in said body, a plurality of friction elements carried by said body intermediate the said members said friction elements comprising a set of disks mounted on each of the said members for rotation therewith, the said sets of disks being disposed alternately in overlapping arrangement, one of the said sets of disks on one of the said members being formed of ferrous material with the other set of disks on the other of the said members being formed of non-ferrous metal having graphite mixed therewith said compression springs adapted to exert a predetermined amount of pressure on said friction elements.

2. In mechanism of the character described, a driving member said member having a cylindrical body, a shoulder portion on said body, vertical threaded bores in said shoulder portion, a driven member having a disk shaped head co-axially related with the driving member, frictionally engageable means carried by the respective members, said frictionally engageable means comprising a set of disks mounted on each of the said members for rotation therewith, the said sets of disks being disposed alternately in overlapping arrangement, one of the said sets of disks being formed of ferrous material and the other set being formed of non-ferrous metal having graphite mixed therewith and means mounted in the bores in said shoulder portion for resiliently thrusting the said friction means into frictional engagement.

3. In mechanism of the character described, a driving member said member having a cylindrical body, a shoulder portion on said body, vertical threaded bores in said shoulder portion, a driven member having a disc shaped head co-axially related with the driving member, frictionally engageable means carried by the respective members, said frictionally engageable means comprising a set of disks mounted on each of the said members for rotation therewith, the said sets of disks being disposed alternately in overlapping arrangement, one of the said sets of disks being formed of ferrous material and the other set being formed of non-ferrous metal having graphite mixed therewith means mounted in the bores in said shoulder portion for resiliently thrusting the said friction means in said bores into frictional engagement, and means for selectively regulating the pressure exerted by the said resilient thrust means against the friction means.

4. In mechanism of the character described, a pair of interfitting male and female members adapted to constitute driving and driven members, a plurality of friction elements fixed to the said respective members, said friction elements comprising a set of disks mounted on each of the said members for rotation therewith, the said sets of disks being disposed alternately in overlapping face engaging relation to each other a shoulder portion on said female member, vertical bores in said shoulder portion, one of the said sets of disks being formed of ferrous material and the other set being formed of non-ferrous metal having graphite mixed therewith and selectively adjustable means in said bores for exerting pressure axially against the said friction elements.

5. In mechanism of the character described, a driving member a cylindrical body on said member, a shoulder portion on said body, a driven member co-axially related with the driving member, a set of disks mounted on each of the said members for rotation therewith, the said sets of disks being disposed alternately in overlapping arrangement, one of the said sets of disks being formed of ferrous material and the other set being formed of non-ferrous metal having graphite mixed therewith, and means carried by the shoulder portion of said female member for exerting pressure resiliently against the disks for continually maintaining the overlapping faces in frictional contact.

6. In mechanism of the character described, a female section having axially extending ribs therein, a plurality of disks mounted transversely in the said section having notches in the periphery thereof slidably engaging the said ribs, a male section detachably connected in co-axial relation with the female section and having a non-circular stud projecting into the female section, a plurality of disks having non-circular central openings slidably fitted on the stud and making non-rotary connection therewith, the said last mentioned disks being disposed alternately with the first mentioned disks said female section comprising a cylindrical body, a shoulder portion on said body, vertical bores in said shoulder portion, one of the said sets of disks being formed of ferrous material and the other set being formed of non-ferrous metal having graphite mixed therewith, means carried by the bores in the shoulder portion of the female section exerting axial pressure against the said disks to maintain the same in frictional engagement, and means for selectively regulating the pressure exerted by the said pressure means.

7. In mechanism of the character described, a cylindrical section open at one end and having an axially extending shank at the opposite end a shoulder portion on said section, vertical bores in said section, a pair of axially extending ribs formed in the said section, a plurality of disks slidably fitted in transverse positions in the section and having notches engaging the said ribs, a complementary section having a disk head removably fitted within the open end of the cylindrical section having an outwardly projecting axial shank, an inwardly projecting stud formed on the said head co-axially with the shanks and non-circular in cross section, a plurality of disks slidably fitted on the said stud and having non-rotary engagement therewith, the said last mentioned disks being disposed alternately between the first mentioned disks, one of said sets of disks being formed of ferrous material and the other set being formed of non-ferrous metal having graphite mixed therewith, a pair of coiled compression springs mounted in the bores in the shoulder portion on the cylindrical section and operative to exert pressure on the disks to maintain the same in frictional engagement, and holding screws mounted in the bores in the shoulder portion on the said cylindrical section retaining the said springs in pressure applying position and adjustable to regulate the pressure exerted by the springs.

FRANK ALDEN MILLER.

REFERENCES CITED

The following references are of record in the file of this patent:

UNITED STATES PATENTS

| Number | Name | Date |
|---|---|---|
| 1,241,117 | Hopkins | Sept. 25, 1917 |
| 1,503,446 | Hedglon | July 29, 1924 |
| 2,256,062 | Taylor | Sept. 16, 1941 |
| 2,260,593 | Wittlinger et al. | Oct. 28, 1941 |
| 2,323,355 | Ricciardi | July 6, 1943 |
| 2,333,980 | Branson | Nov. 9, 1943 |

FOREIGN PATENTS

| Number | Country | Date |
|---|---|---|
| 19,710 | Australia | 1934 |
| 533,842 | Great Britain | 1941 |